United States Patent
Ochi et al.

(10) Patent No.: US 7,354,378 B2
(45) Date of Patent: Apr. 8, 2008

(54) MOTOR VEHICLE, CONTROL UNIT, DRIVING FORCE TRANSMISSION SYSTEM, AND MOTOR VEHICLE CONTROL METHOD

(75) Inventors: Tatsuya Ochi, Tokai-mura (JP); Toshimichi Minowa, Mito (JP); Takashi Okada, Hitachi (JP); Hiroshi Sakamoto, Hitachi (JP); Naoyuki Ozaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 104 days.

(21) Appl. No.: 10/986,139

(22) Filed: Nov. 12, 2004

(65) Prior Publication Data

US 2005/0126321 A1 Jun. 16, 2005

(30) Foreign Application Priority Data

Dec. 12, 2003 (JP) ............................. 2003-414077

(51) Int. Cl.
*B60W 10/04* (2006.01)
(52) U.S. Cl. ...................................... 477/115; 477/125
(58) Field of Classification Search ................. 74/335, 74/336 R, 329; 477/115, 116, 120, 125, 477/174, 175, 180
See application file for complete search history.

(56) References Cited

U.S. PATENT DOCUMENTS

| | | | | |
|---|---|---|---|---|
| 5,658,219 A | * | 8/1997 | Kondo et al. | 477/122 |
| 5,738,607 A | * | 4/1998 | Kondo et al. | 477/125 |
| 6,085,140 A | * | 7/2000 | Choi | 701/55 |
| 6,128,566 A | * | 10/2000 | Nishino | 701/52 |
| 6,726,597 B2 | * | 4/2004 | Yu | 477/121 |
| 2004/0073348 A1 | * | 4/2004 | Stragapede | 701/51 |

FOREIGN PATENT DOCUMENTS

JP 2000-065199 3/2000

* cited by examiner

*Primary Examiner*—Charles A. Marmor
*Assistant Examiner*—Justin K. Holmes
(74) *Attorney, Agent, or Firm*—Crowell & Moring LLP

(57) ABSTRACT

A large gearshift shock that occurs if a renewed gearshift operation is forcibly carried out in order to meet a new gearshift request made through a driver's operating an accelerator pedal or a signal from an operation lever during a current gearshift operation. Gearshift response lag occurs due to an attempt to avoid the large gearshift shock. To solve these problems, a control system for a gear type transmission is mounted. The control system is provided with a renewed gearshift disabling period, during which any renewed gearshift request to a third predetermined gearshift position made during a gearshift operation from a first predetermined gearshift position to a second predetermined gearshift position is disabled.

7 Claims, 11 Drawing Sheets

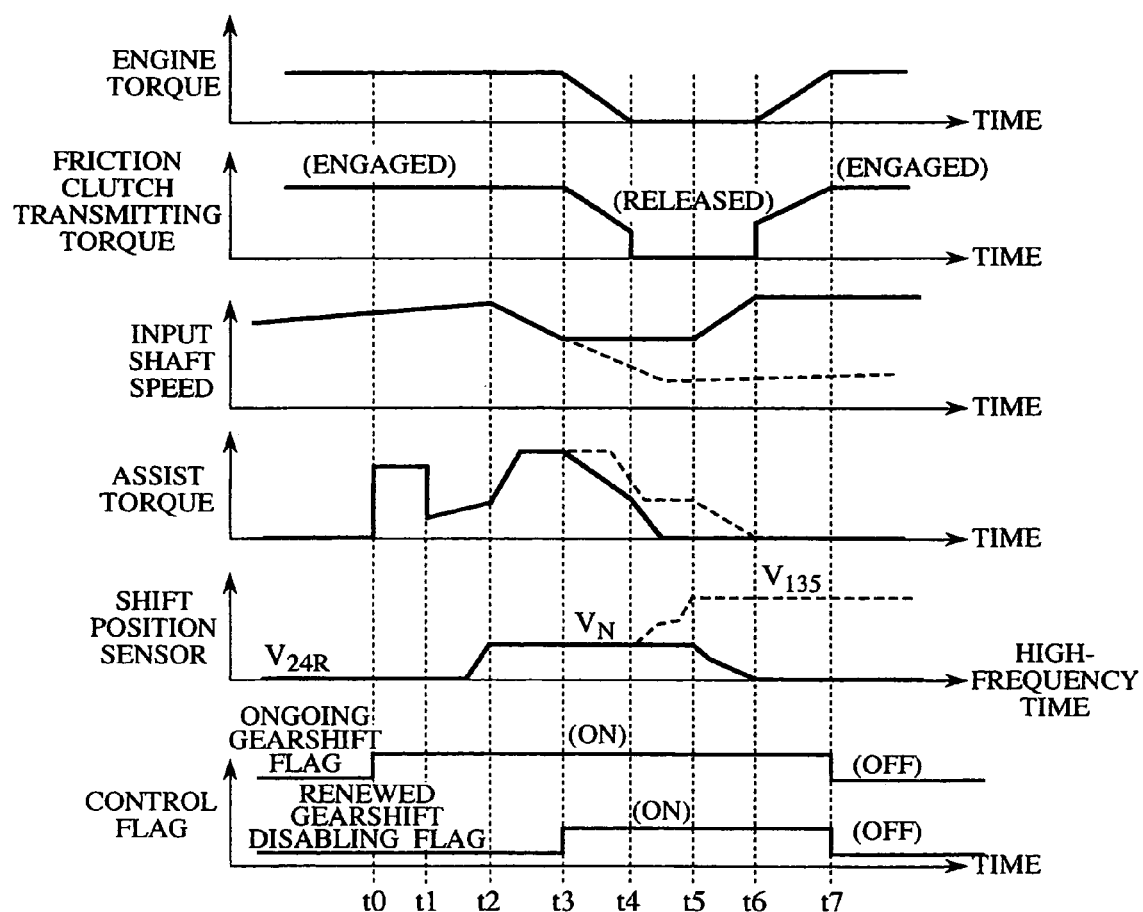

MOTOR VEHICLE, CONTROL UNIT, DRIVING FORCE TRANSMISSION SYSTEM, AND MOTOR VEHICLE CONTROL METHOD

BACKGROUND OF THE INVENTION

The present invention relates generally to a motor vehicle, and control of a gear type transmission and, more particularly, to a new gearshift operation when another request for gearshift is made while a current gearshift operation is being carried out.

Developed in later years as a transmission for automobiles and other vehicles is an automated manual transmission including a friction clutch and a two-parallel-axis type transmission. This type of transmission is what is called a gear type automatic transmission. The gear type automatic transmission shares the same basic construction with the manual transmission. In the gear type automatic transmission, a hydraulically operated actuator or an electrically operated actuator is used for operating the friction clutch and performing gearshifts for eventually connecting or disconnecting torque between a prime mover and the transmission.

The gear type automatic transmission such as that described above includes no hydraulic clutch (a torque converter) interposed in a driving power transmitting system between the prime mover and a driving wheel. As compared with an automatic transmission using the torque converter, therefore, the gear type automatic transmission offers greater transmission efficiency and greater fuel economy. The gear type automatic transmission is also free from a slip feel that is unique to the torque converter, leading to improved drivability.

To accomplish a gearshift in the gear type automatic transmission, however, the friction clutch is temporarily released, during which a gear train forming a new gearshift position is properly selected. Because of this operation, there temporarily exists a torque interruption period, during which power generated by the prime mover is not transmitted to the driving wheel. This gives occupants of a vehicle a sense of discomfort as a gearshift shock. To solve this problem, proposed is a transmission that includes transmitting torque variable means interposed between an input shaft and an output shaft of the gear type automatic transmission (for example, Japanese Patent Laid-open No. 2000-65199). The transmitting torque variable means function to transmit torque while a gearshift is being carried out. Such an automatic transmission including the transmitting torque variable means can suppress torque interruption during the gearshift, offering outstandingly improved gearshift performance.

A gearshift control system for controlling the gear type automatic transmission as described above operates similarly to the automatic transmission with a torque converter as follows: Specifically, while the vehicle is running in an automatic gearshift mode, the gear type automatic transmission uses a previously set gearshift map as shown in FIG. 3. Then, a target gearshift position is calculated from an accelerator opening (an operated amount of acceleration means) that represents an amount of an accelerator pedal depression and a vehicle speed. The hydraulic or electric actuator is then operated to execute the gearshift to the target gearshift position. If a new gearshift command (a new gearshift request) is issued during the gearshift operation establishing the specified gearshift position, as through an operation by the driver to operate the accelerator pedal or the like, therefore, a renewed gearshift operation is to be executed as a result of the change in the target gearshift position.

If the transmission is forced into a renewed gearshift operation during a current gearshift operation, however, an attempt is made to release a friction element in a process of an engagement operation or to engage a friction element in a process of a release operation. This produces a sudden change in a rotating speed or an engagement capacity, resulting in a large gearshift shock. It then becomes inevitable to allow the gearshift operation to progress over an extended period of time so as to avoid the large gearshift shock. This presents a problem of a prolonged delay in gearshift response (gearshift time).

SUMMARY OF THE INVENTION

To solve the foregoing problem, the present invention provides the following control when a request is made to change gears into a gearshift position that is different from the target gearshift position for the current gearshift operation carried out in the gear type automatic transmission. Specifically, the present invention prohibits any renewed gearshift into that another gearshift position. Alternatively, the invention allows the gearshift operation into the currently targeted gearshift position to continue. Alternatively, the invention releases the friction clutch provided between the prime mover and the gear type automatic transmission, thereby temporarily interrupting a driving force applied from the prime mover to the gear type automatic transmission.

A gearshift shock involved with the renewed gearshift operation can be suppressed. In addition, the gearshift response delay during execution of the renewed gearshift operation can be improved.

BRIEF DESCRIPTION OF THE INVENTION

Other objects and advantages of the invention will become apparent from the following description of embodiments with reference to the accompanying drawings in which:

FIG. 12 is a timing chart showing control operations performed by the control system for the gear type transmission according to the third embodiment of the present invention.

DETAILED DESCRIPTION OF THE PREFERRED EMBODIMENTS

Control of an automatic transmission according to a first preferred embodiment of the present invention will be described with reference to FIGS. 1 through 7.

Figure 1:
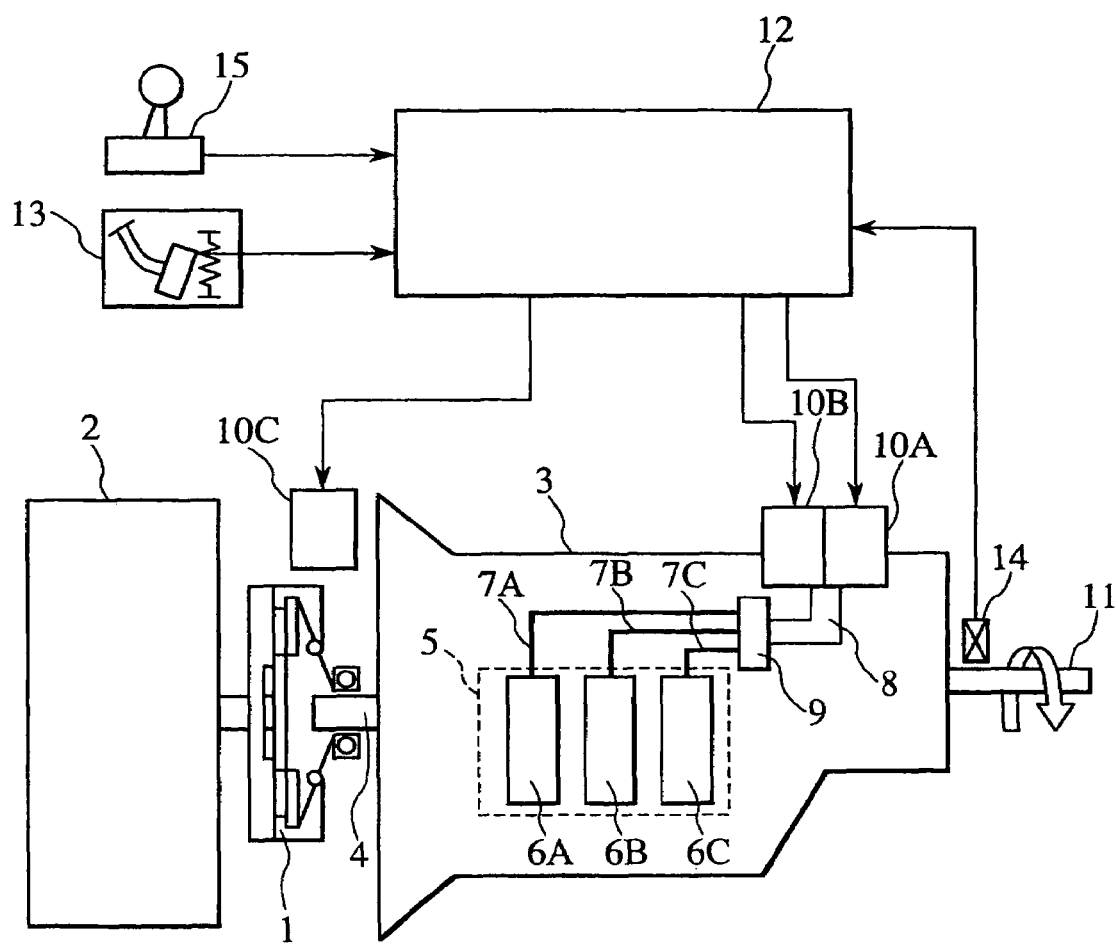
FIG. 1 is a block diagram showing an overall construction of a control system for a gear type transmission according to a first embodiment of the present invention.

Referring to FIG. 1, in the transmission of a vehicle adopting the first preferred embodiment of the present invention, power drive generated by a prime mover 2 is applied through a friction clutch 1 to an input shaft 4 of a gear type transmission 3. The gear type transmission 3 includes a gear train 5. The gear train 5 has clutch mechanisms 6A to 6C that function as a mechanism (preferably a synchromesh) for selecting an appropriate meshing combination of the gear train 5. The clutch mechanisms 6A to 6C are constructed so as to shift in an axial direction of the gear train 5 by shift forks 7A to 7C, respectively. A gate member 9 of a rotary selection type, with which a leading end of a shift select shaft 8 is engaged selectively, is mounted at a proximal end of each of the shift forks 7A to 7C. The shift select shaft 8 is driven in a shift direction and a rotary direction (a select direction) by a direct acting type shift actuator 10A and a rotary type select actuator 10B. The actuators 10A and 10B are either hydraulically or electrically driven. Sensors (not shown) are provided for the actuators 10A and 10B. These sensors detect the respective amounts of movement of movable members of the actuators 10A and 10B through a shift operation and a select operation. The shift select shaft 8 performs the shift operation or the select operation through the following operation. Specifically, if the actuators 10A and 10B are hydraulically driven, current is supplied to each of solenoid valves for controlling a hydraulic pressure or a flow rate in a hydraulic circuit. If the actuators 10A and 10B are electrically driven, current is supplied to a motor or the like. Through this operation, a torque transmitting path of the gear type transmission 3 is properly selected and the torque is output from an output shaft 11.

An accelerator opening sensor 13 detecting an angle of depression of an accelerator pedal and a vehicle speed sensor 14 detecting a rotating speed of the output shaft 11 are connected to a control unit 12. Based on signals provided by these sensors, the control unit 12 calculates a gearshift command according to the gearshift map shown in FIG. 3. In some special systems, the gearshift command may be calculated by receiving an input of a gearshift request signal from an operation lever 15 provided in a driver's seat.

Figure 2:
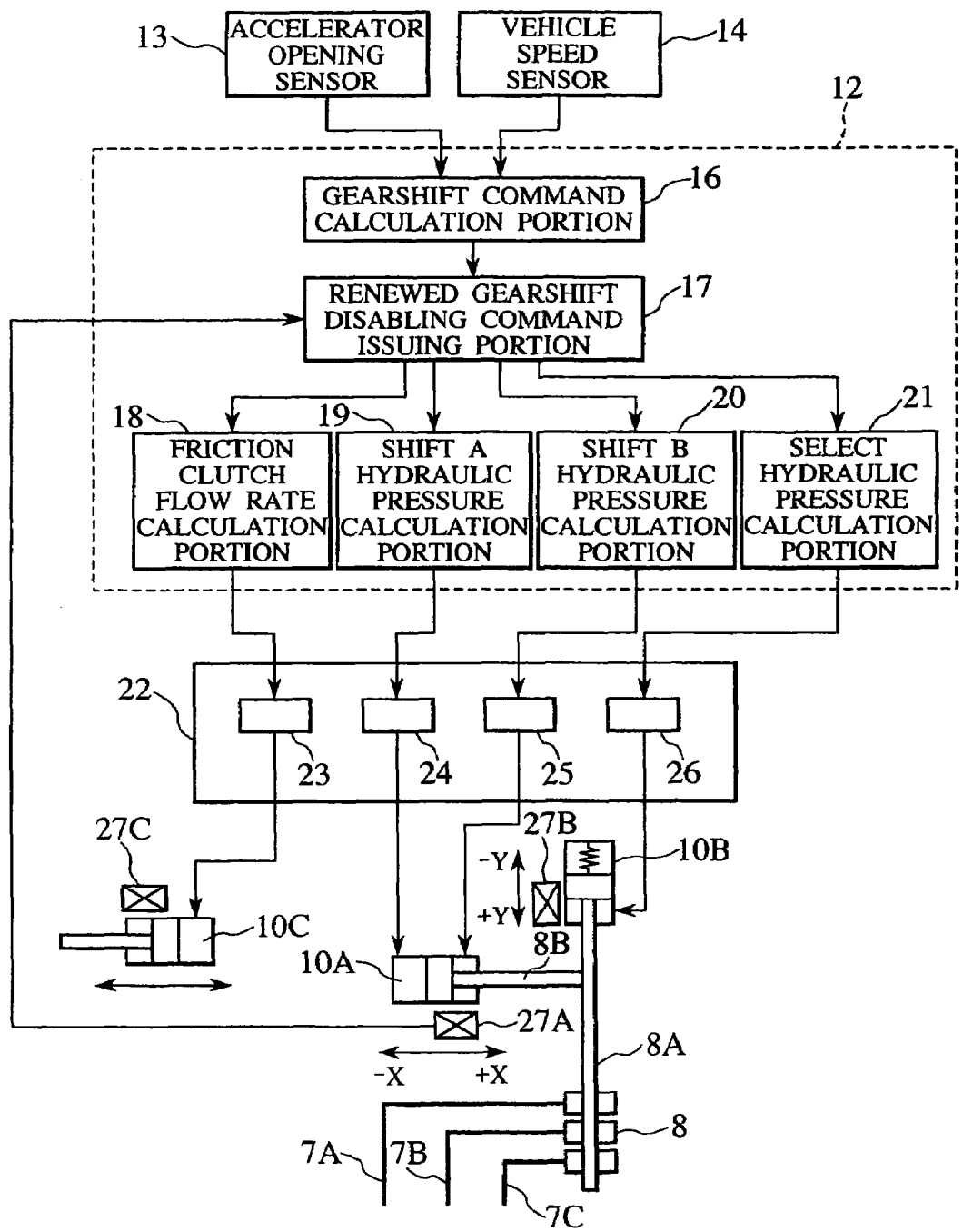
FIG. 2 is a block diagram showing a detailed construction of the control system for the gear type transmission according to the first embodiment of the present invention.
Figure 3:
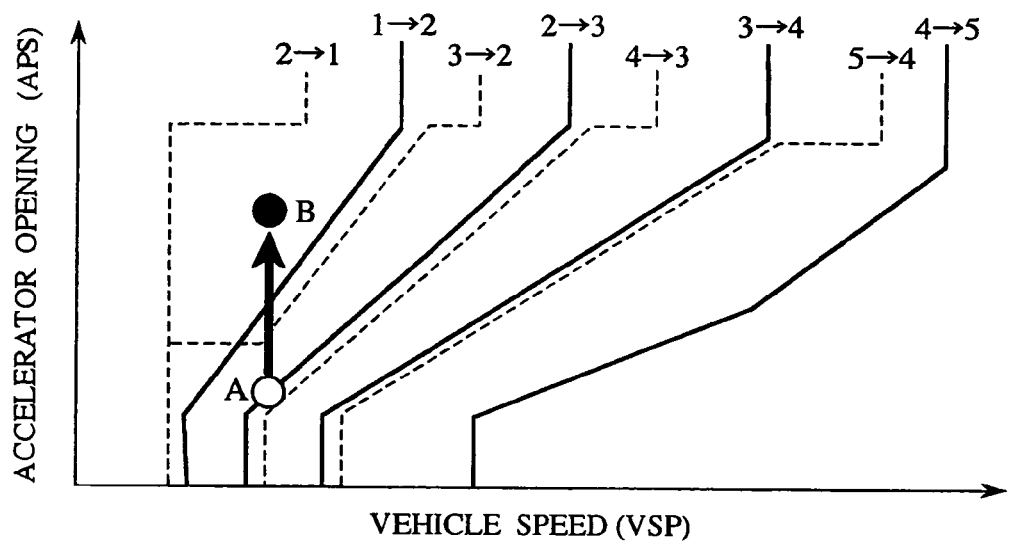
FIG. 3 is a gearshift map used by the control system for the gear type transmission according to the first embodiment of the present invention.

A control system for the gear type transmission in accordance with the preferred embodiment of the present invention will be described in detail with reference to FIG. 2. In FIG. 2, like parts are identified by the same reference numerals as in FIG. 1. Shown inside a dotted line in FIG. 2 is the control unit 12. The control unit 12 causes a gearshift command calculation portion 16 to generate a gearshift command signal based on the signal from the accelerator opening sensor 13 and the signal from the vehicle speed sensor 14. Specifically, the gearshift map shown in FIG. 3 is stored in memory. Based on the gearshift command signal generated by the gearshift command calculation portion 16, a gearshift operation is executed. In the gearshift operation, the friction clutch 1 is engaged and released and the appropriate meshing combination of the gear train 5 is selected. To execute the gearshift operation, the hydraulic pressure or the flow rate acting on each of actuators 10A to 10C is calculated by a friction clutch flow rate calculation portion 18, a shift A hydraulic pressure calculation portion 19 and a shift B hydraulic pressure calculation portion 20, and a select hydraulic pressure calculation portion 21, respectively. Each of these calculation portions 18 to 21 is made up of the following two portions. Specifically, one of the portions is a calculation portion that sets up a supply current amount for each of solenoids 23 to 26 of a hydraulic circuit 22. Another portion is a driving circuit portion. The driving circuit portion first converts data representing a specified value of the supply current amount calculated by the calculation portion to a corresponding analog signal and produces an output of a command current value. In addition, the driving circuit portion supplies each of the solenoids 23 to 26 of the hydraulic circuit 22 with a current output corresponding to the command current value.

Each of the solenoids 23 to 26 of the hydraulic circuit 22 drives each of control valves for controlling, through the hydraulic circuit 22, the hydraulic pressure and the flow rate of a hydraulic oil supplied to the cylinder type shift actuator 10A, the select actuator 10B, and a friction clutch actuator 10C. The hydraulic pressure sets an operating direction and an operating pressure of the shift actuator 10A and the select actuator 10B. The flow rate, on the other hand, sets an operating speed of the friction clutch actuator 10C. This allows the control unit 12 to control positions of the shift select shaft 8 and the friction clutch 1.

An arrangement operating the shift fork 7 shown in FIG. 1 is schematically shown as, for example, two mutually perpendicular shafts 8A, 8B for the shift select shaft 8 shown in FIG. 2. The shaft 8A is connected to a piston in the select actuator 10B. The shaft 8B is connected to a piston in the shift actuator 10A. The gate member 9 is formed as a fitting groove. The gate member 9 is connected to the proximal end of each of the shift forks 7A to 7C. The shaft 8A can move the gate member 9 in a +Y direction by controlling the hydraulic pressure acting on the select actuator 10B. The gate member 9 is moved in a −Y direction by a reaction force of a spring. The shift actuator 10A for moving the shaft 8B in a □X direction is integrally formed with the gate member 9. With the arrangement described above, the shift actuator 10A can move in the ±Y direction through an operation operatively connected to the select operation of the select actuator 10B.

The arrangement including the hydraulic circuit 22, the shift actuator 10A, the select actuator 10B, the gate member 9, and the shift fork 7 causes the shift fork 7 selected by the select actuator 10B to make a stroke movement along the ±X direction through the operation of the shift actuator 10A in the ±X direction. The clutch mechanisms 6A to 6C can thus be engaged or released.

Figure 4:
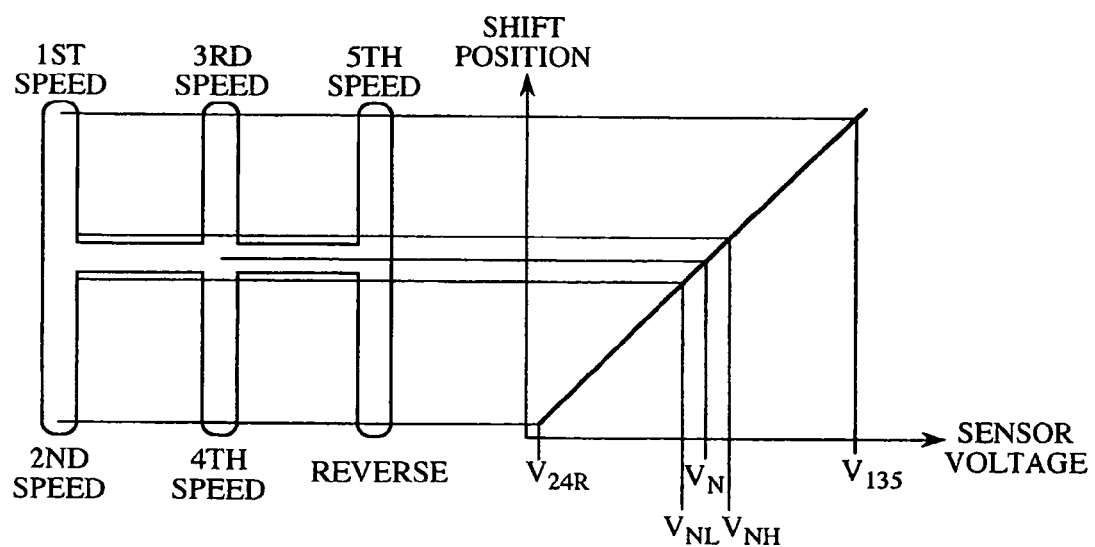
FIG. 4 is a schematic diagram showing characteristics of a shift position sensor used in the gear type transmission according to the first embodiment of the present invention.

The shift select shaft 8 makes a stroke motion through the shift operation and the select operation. The amount of movement (a shift position and a select position) of the shift select shaft 8 is detected by a position sensor 27A and a position sensor 27B mounted on the corresponding cylinders. The shift position sensor 27A has characteristics as shown in FIG. 4. The sensor 27A provides a linear output voltage relative to the shift operation stroke.

The control unit 12 uses these sensor signals for determining progress of the gearshift operation. The control unit 12 causes a renewed gearshift disabling command issuing portion 17 to produce an output of a renewed gearshift disabling command, thereby prohibiting any renewed gearshift request during a gearshift operation. As long as the renewed gearshift disabling command is being issued, each of the calculation portions 18 to 21 calculates the hydraulic pressure and the flow rate applicable to each actuator. This is done to allow the currently progressing gearshift operation to continue, while prohibiting a renewed gearshift operation in response, for example, to a downshift request to a 2nd speed (renewed gearshift request) made by the driver's depressing the accelerator pedal (an operating point B) during an upshift operation (an operating point A) from the 2nd speed to a 3rd speed as shown in FIG. 3.

The arrangements as described in the foregoing allow a renewed gearshift disabling command to be issued when a new gearshift request is made during the current gearshift operation. This suppresses a large gearshift shock that would otherwise be involved with a renewed gearshift operation.

Figure 5:
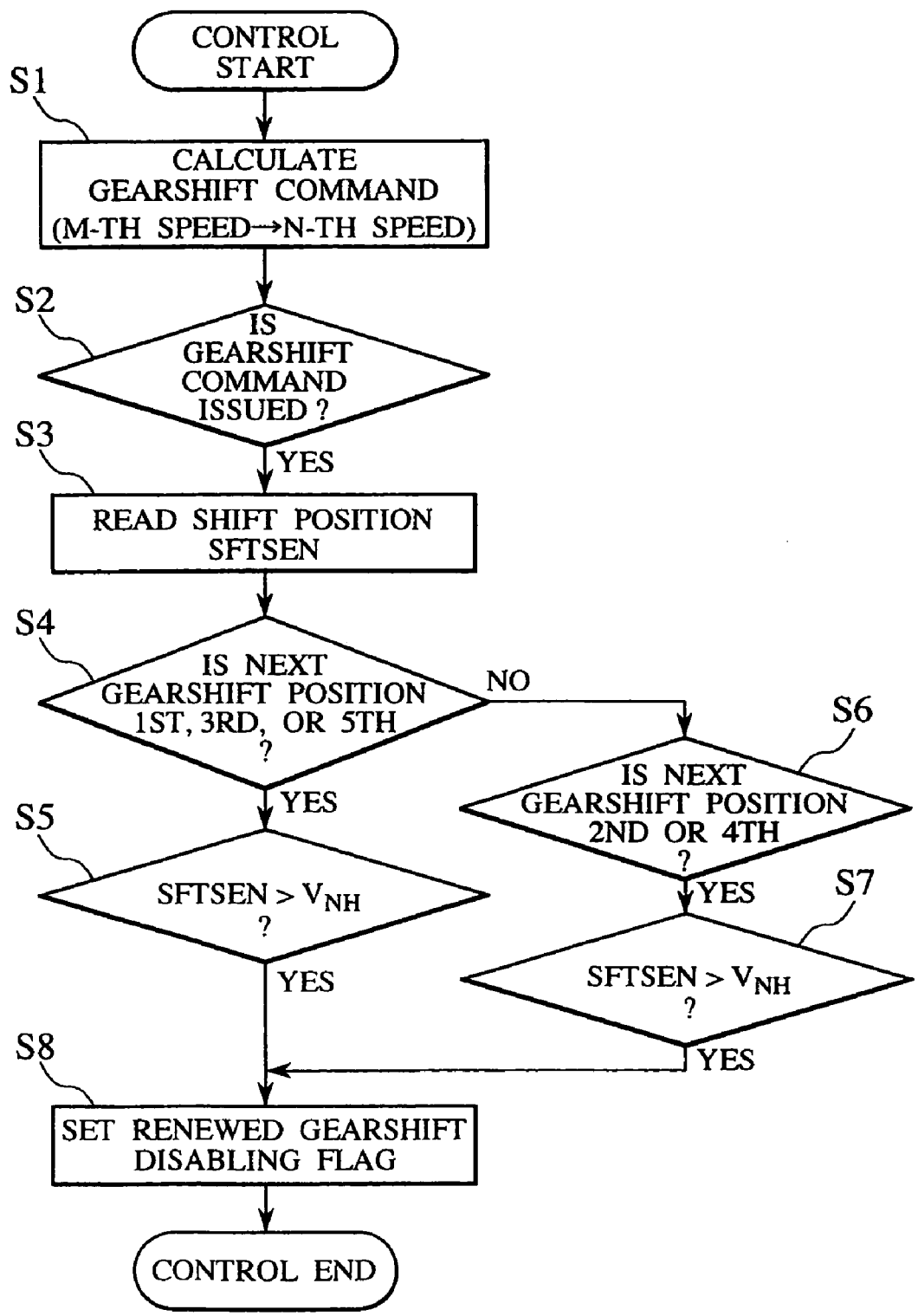
FIG. 5 is a flowchart showing control operations performed by the control system for the gear type transmission according to the first embodiment of the present invention.

Operations (control methods) of the control system having the arrangements as described in the foregoing for the gear type transmission will be described with reference to FIG. 5. FIG. 5 is a flowchart showing control of the gear type transmission according to the preferred embodiment of the present invention. The flowchart shown in FIG. 5 corresponds to a program written in a microprocessor of the control unit 12. More specifically, step S1 is performed by the gearshift command calculation portion 16. Receiving inputs of signals from the accelerator opening sensor 13 and the vehicle speed sensor 14, the gearshift command calculation portion 16 calculates a gearshift command from an m-th speed to an n-th speed using the gearshift map shown in FIG. 3. In step S2, it is determined whether or not a gearshift command is issued. Until a gearshift command is issued, loop processing is performed. When a gearshift command is issued, the control operation proceeds to step S3. In step S3, the signal from the shift position sensor 27A is read so that a position in the shift direction is detected. The progress of the gearshift operation is thereby detected. In step S4 that follows, it is determined whether or not the next predetermined gearshift position (the n-th speed) is in the same shift direction of the 1st speed, the 3rd speed, or the 5th speed. If it is determined that the next predetermined gearshift position is in the same shift direction of the 1st speed, the 3rd speed, or the 5th speed, the control operation proceeds to step S5. If it is determined that the next predetermined gearshift position is not in the same shift direction of the 1st speed, the 3rd speed, or the 5th speed, the control operation proceeds to step S6. Similarly, in step S6, it is determined whether or not the next predetermined gearshift position (the n-th speed) is in the same shift direction of the 2nd speed or the 4th speed. If it is determined that the next predetermined gearshift position is in the same shift direction of the 2nd speed or the 4th speed, the control operation proceeds to step S7. In step S5 and step S7, it is determined whether or not a gearshift operation into the next gearshift position (the n-th speed) is started. What is done in step S5 or step S7 is to compare the current shift position with a predetermined threshold value.

If the position sensor signal exceeds the predetermined threshold value, it is determined that the final shift operation into the n-th speed is started. To disable any renewed gearshift request made thereafter during the process of the gearshift operation, the control operation proceeds to step S8. In step S8, a renewed gearshift disabling flag is set. The operations from step S3 through step S8 are performed by the renewed gearshift disabling command issuing portion 17. For a period of time during which the renewed gearshift disabling flag is set, the results of the gearshift command calculation performed in step S1 are not reflected.

As described in the foregoing, the gearshift shock occurring due to the renewed gearshift operation can be suppressed by setting the renewed gearshift disabling period during the gearshift operation.

Figure 6:
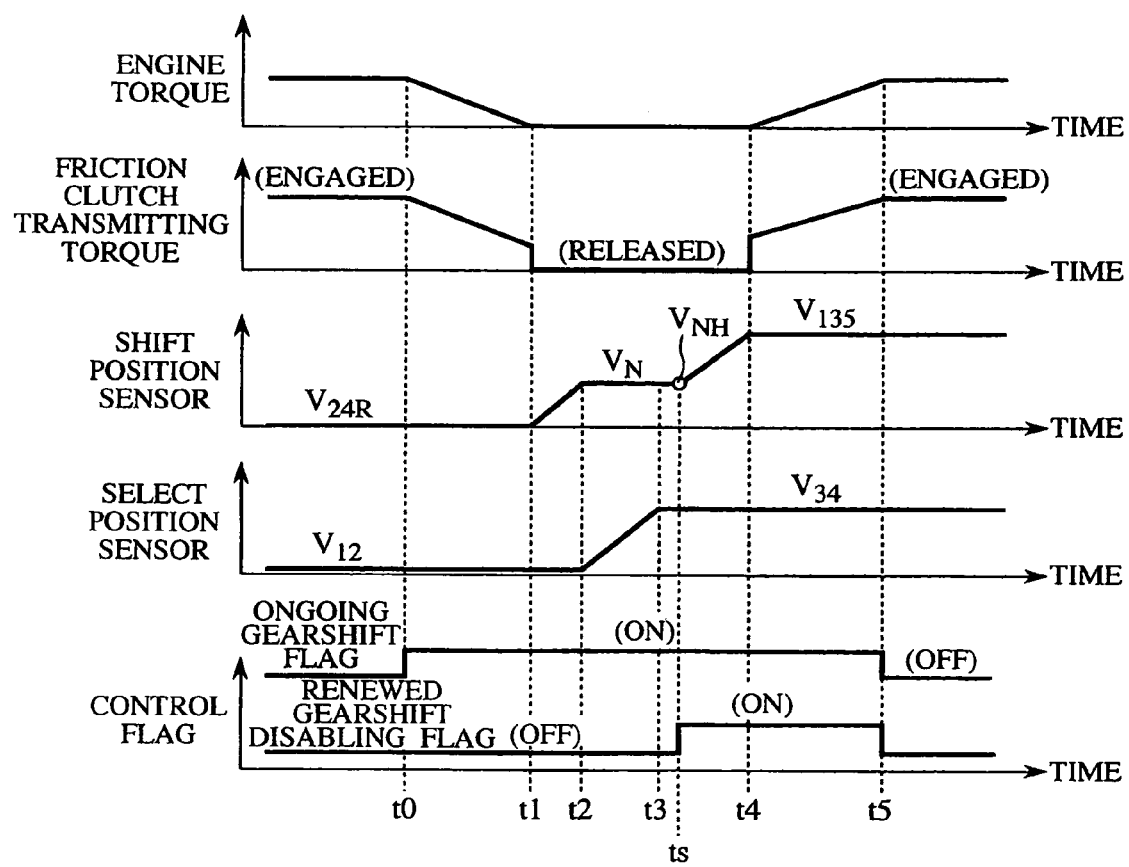
FIG. 6 is a timing chart showing control operations performed by the control system for the gear type transmission according to the first embodiment of the present invention.

FIG. 6 is a timing chart showing the control method used by the control system of the gear type transmission according to the preferred embodiment of the present invention. The timing chart represents an auto upshift from the 2nd speed to the 3rd speed.

At time t0, the gearshift command (from the 2nd speed to the 3rd speed) is determined according to the gearshift map. An ongoing gearshift flag as a control flag is then set. Starting with time t0, a throttle opening (not shown) is reduced to decrease an engine torque. At the same time, the flow rate acting on the friction clutch actuator 10C is controlled so as to reduce torque of the friction clutch 1 in response to the amount of decrease in the engine torque. When it is detected at time t1 that the engine torque has reduced to a point near zero, the hydraulic pressure acting on the shift actuator 10A is controlled in order to release the friction clutch and move the shift position from a 2nd speed position (V24R) to a neutral position (VN). When it is detected at time t2 that the shift position has been moved to the neutral position, the hydraulic pressure acting on the select actuator 10B is controlled so that the select position is moved from a 1st-2nd speed position (V12) to a 3rd-4th speed position (V34). When it is next detected at time t3 that the select position has been moved to the 3rd-4th speed position (V34), the hydraulic pressure acting on the shift actuator 10A is controlled so that the shift position is the 3rd speed position which is the next gear position.

The renewed gearshift disabling flag is set based on the decision made that the final shift operation is started at time ts, at which the shift position exceeds a predetermined criterion value VNH. This operation corresponds to the operations performed in steps from step S2 through step S7 shown in FIG. 5.

When it is detected at time t4 that the shift operation to the 3rd speed has been completed, the throttle opening (not shown) is increased to the original opening, thereby recovering the engine torque. At the same time, the transmitting torque in the friction clutch 1 is increased to engage the friction clutch 1. Then at time t5, a series of the upshift operation from the 2nd speed to the 3rd speed is completed.

During the period of time through which the renewed gearshift disabling flag is set, any attempt to perform a renewed gearshift operation, including a driver's accelerator operation or a signal from the operation lever 15, is not authorized. The next gearshift operation is executed at any timing after time t5.

As described in the foregoing, the gearshift shock occurring due to the renewed gearshift operation can be suppressed by setting the renewed gearshift disabling period during the gearshift operation.

A control system and a control method of a gear type transmission according to a second preferred embodiment of the present invention will be described with reference to FIGS. 7 through 10.

Figure 7:
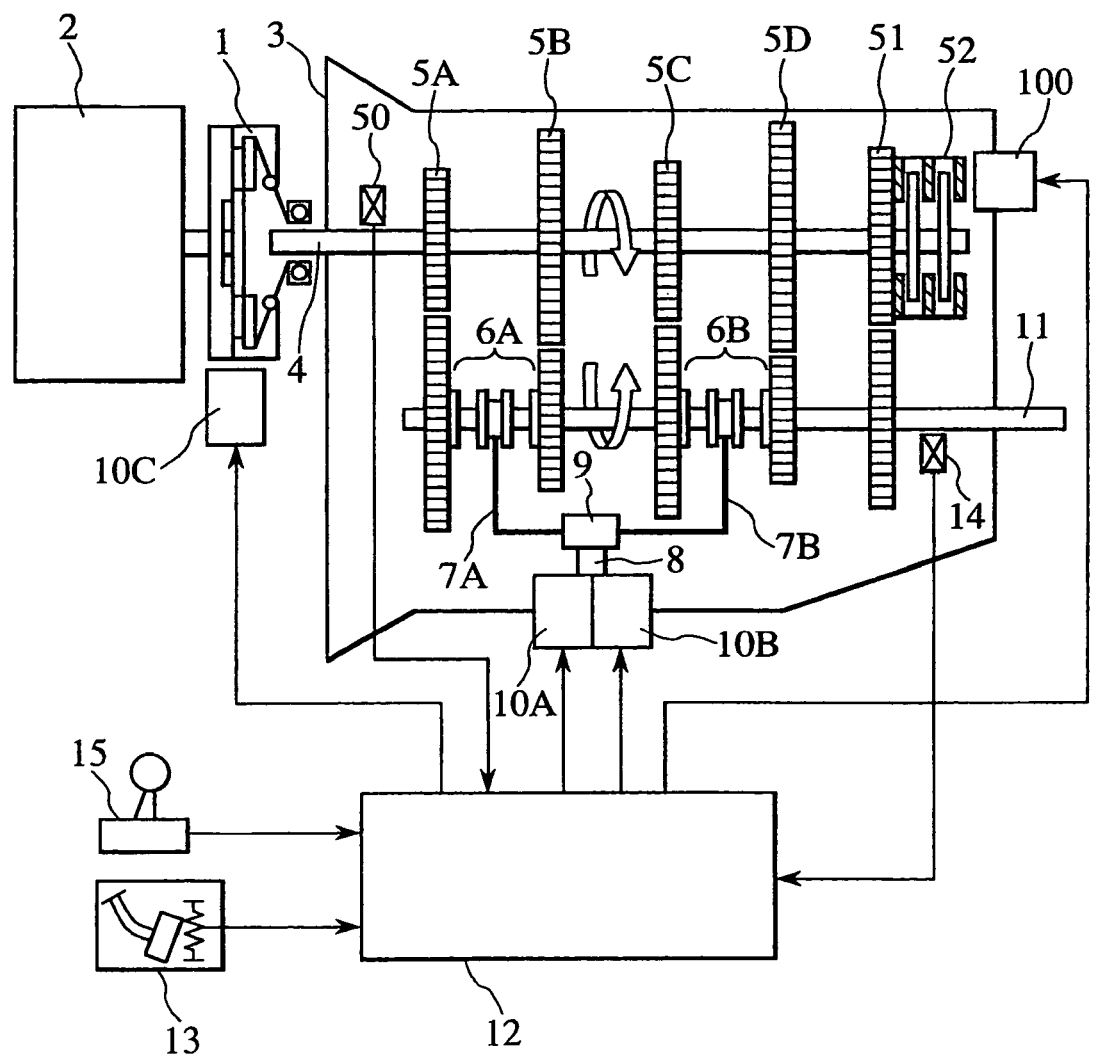
FIG. 7 is a block diagram showing an overall construction of a control system for a gear type transmission according to a second embodiment of the present invention.
Figure 8:
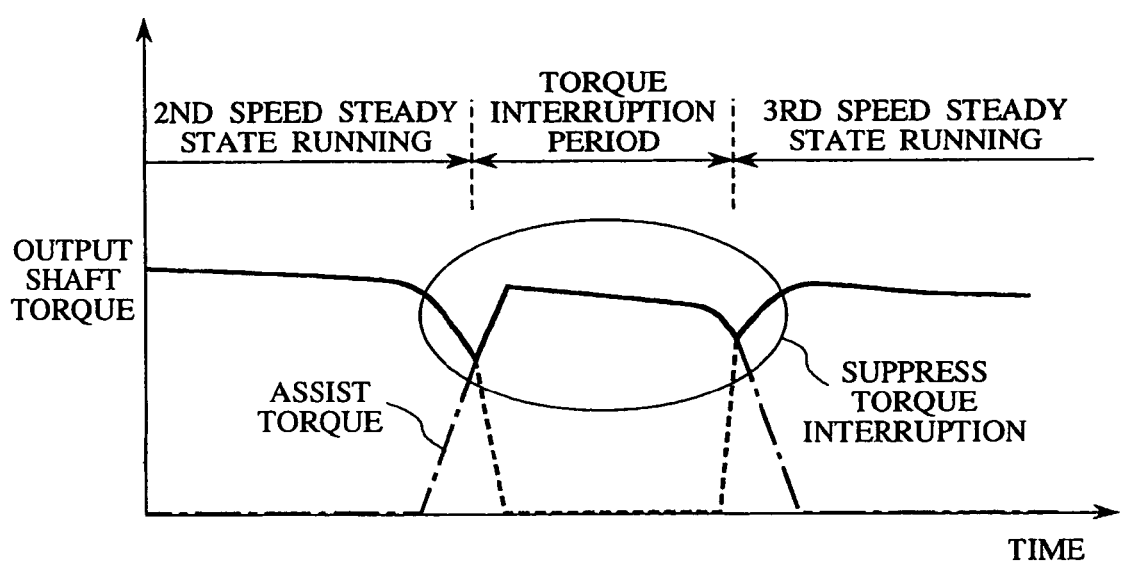
FIG. 8 is a schematic diagram showing gearshift performance of the gear type transmission according to the second embodiment of the present invention.

FIG. 7 is a block diagram showing an overall construction of the control system for the gear type transmission according to the second preferred embodiment of the present invention. In accordance with the first preferred embodiment of the present invention described heretofore, the friction clutch 1 is released during the gearshift operation and, during that time, the gear train 5 forming the gearshift position is selected. As a result, there exists a torque interruption period, during which the power drive generated by the prime mover is not temporarily transmitted to the driving wheel as shown in FIG. 8. This gives the occupants of the vehicle a sense of discomfort as a gearshift shock. In accordance with the second preferred embodiment of the present invention, therefore, a gear type transmission shares the same basic construction as that shown in FIG. 1, mounted with transmitting torque variable means that permits transmission of torque during the gearshift. Like parts are identified by the same reference numerals as in FIG. 1 and detailed descriptions for these parts will be omitted.

Referring to FIG. 7, a gear train 51 and a wet type multiple disc clutch 52 adjoining thereto are used as the transmitting torque variable means. The transmitting torque variable means may be formed by the mechanism disclosed as publicly known art in Japanese Patent Laid-open No. 2001-213201, instead of the wet type multiple disc clutch. Like the shift actuators 10A, 10B, the wet type multiple disc clutch 52 is operated by setting the hydraulic pressure acting on a hydraulic actuator 10D using the control unit 12. When the wet type multiple disc clutch 52 is operated, transmitting torque (assist torque) required during the gearshift operation is generated. This suppresses torque interruption during the gearshift as shown in FIG. 8 and thus improves gearshift performance.

Figure 9:
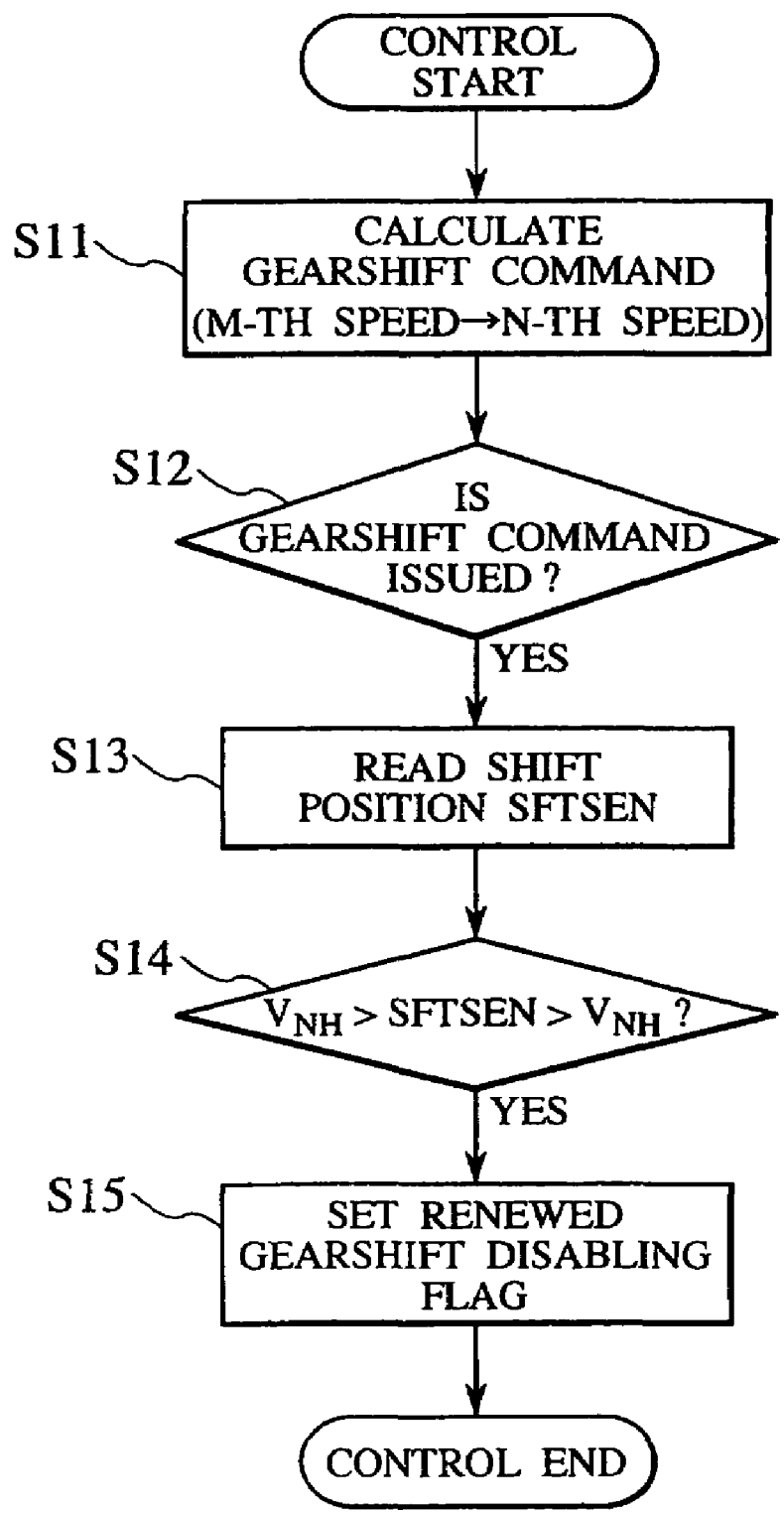
FIG. 9 is a flowchart showing control operations performed by the control system for the gear type transmission according to the second embodiment of the present invention.

FIG. 9 is a flowchart showing the control method used by the control system for the gear type transmission according to the second preferred embodiment of the present invention. The flowchart shown in FIG. 9 corresponds to a program written in the microprocessor of the control unit 12. More specifically, step S11 is performed by the gearshift command calculation portion 16. Receiving inputs of signals from the accelerator opening sensor 13 and the vehicle speed sensor 14, the gearshift command calculation portion 16 calculates a gearshift command from the m-th speed to the n-th speed using the gearshift map shown in FIG. 3. In step S12, it is determined whether or not a gearshift command is issued. Until a gearshift command is issued, loop processing is performed. When a gearshift command is issued, the control operation proceeds to step S13. In step S13, the signal from the shift position sensor 27A is read so that a position in the shift direction may be detected. The progress of the gearshift operation is thereby detected.

In step S14 that follows, it is determined whether or not the shift position has reached the neutral position. Specifically, in step S14, a value corresponding to the current shift position is compared with a predetermined threshold value. If the position sensor signal falls within the range of the threshold values (from VNH to VNL), the shift position is the neutral position. It is then determined that the transmitting torque achieved by the gear train forming the required gearshift position before the gearshift becomes zero. The control operation then proceeds to step S15 in order to disable any renewed gearshift request to be made during the subsequent gearshift operation. In step S15, the renewed gearshift disabling flag is set. The operations from step S13 through step S15 are performed by the renewed gearshift disabling command issuing portion 17. For the period of time during which the renewed gearshift disabling flag is set, the results of the gearshift command calculation performed in step S11 are not reflected.

As described in the foregoing, the gearshift shock occurring due to the renewed gearshift operation can be suppressed by setting the renewed gearshift disabling period during the gearshift operation.

Figure 10:
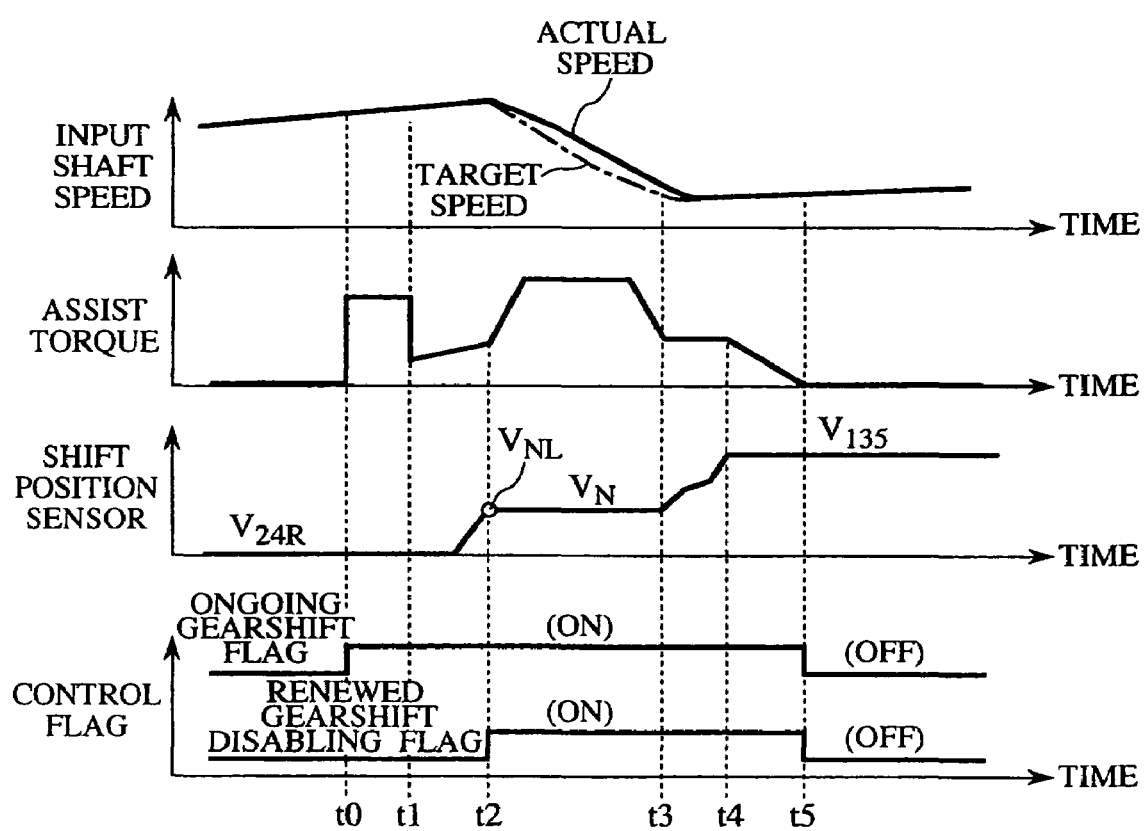
FIG. 10 is a timing chart showing control operations performed by the control system for the gear type transmission according to the second embodiment of the present invention.

FIG. 10 is a timing chart showing the control method used by the control system of the gear type transmission according to the second preferred embodiment of the present invention. The timing chart represents an auto upshift from the 2nd speed to the 3rd speed.

At time t0, the gearshift command (from the 2nd speed to the 3rd speed) is determined according to the gearshift map. An ongoing gearshift flag as a control flag is then set. Starting with time to, the transmitting torque (the assist torque) generated by the wet type multiple disc clutch 52 is increased. At the same time, a feeble load (not shown) is applied to the shift actuator 10A so as to move the shift position in the neutral direction. This approach is effective in smoothly transferring the power drive generated by the prime mover from the gear train forming the 2nd speed condition to the wet type multiple disc clutch 52. The assist torque is set to a large value in a stepwise fashion for the period from the start of the gearshift operation to time t1. The assist torque is thereafter set to a value corresponding to the engine torque. An overshoot in the hydraulic pressure in the beginnings of application of the hydraulic pressure, such as the one described above, is referred to as precharge control. The precharge control is an effective approach toward improving a response lag in the hydraulic pressure acting on the wet type multiple disc clutch 52. When the torque generated by the prime mover substantially balances the assist torque in the wet type multiple disc clutch 52 at time t2, the shift position is mechanically shifted from the 2nd speed position (V24R) to the neutral position (VN).

The renewed gearshift disabling flag is set based on the decision made that the transmitting torque achieved by the gear train forming the 2nd speed condition becomes zero at time t2, at which the shift position exceeds the predetermined criterion value VNL. This operation corresponds to the operations performed in steps S14 and S15 shown in FIG. 9.

At time t2, an assist torque value, to which a change in the rotating speed is added to reduce the rotating speed in the input shaft 4 within a predetermined target period of time, is set. Starting with time t2, the rotating speed in the input shaft 4 is thus decreased. Feedback control of the assist torque is then executed so that the rotating speed of the input shaft 4 follows a target trajectory (shown by a dash-single-dot line in FIG. 10). When it is detected at time t3 that the input shaft rotating speed substantially coincides with the target rotating speed after the gearshift, a gearshift operation to the next gearshift position of the 3rd speed is executed. The shift position then moves in the 3rd speed direction. When it is detected at time t4 that the gearshift operation to the 3rd speed is completed, the assist torque is then decreased in a ramp shape. Then at time t5, a series of the upshift operation from the 2nd speed to the 3rd speed is completed.

During the period of time through which the renewed gearshift disabling flag is set, any attempt to perform a renewed gearshift operation, including a driver's accelerator operation or a signal from the operation lever 15, is disabled. The next gearshift operation is executed at any timing after time t5.

As described in the foregoing, the gearshift shock occurring due to the renewed gearshift operation can be suppressed by setting the renewed gearshift disabling period during the gearshift operation.

In the control method used by the control system for the gear type transmission according to the second preferred embodiment of the present invention, the renewed gearshift operation is disabled in the beginnings of the current gearshift operation. This presents the problem that a delay in gearshift response (gearshift time) is prolonged before the next gearshift request is met. A control method for improving the gearshift response lag will be described in the following. This approach further limits the renewed gearshift disabling period.

In the control method used by the control system for the gear type transmission according to a third preferred embodiment of the present invention, it is possible to enable a renewed gearshift operation for the period of time from time t0 to time t3, during which a gearshift command is issued, shown in FIG. 10. That is, the renewed gearshift disabling flag is set after time t3.

Figure 11:
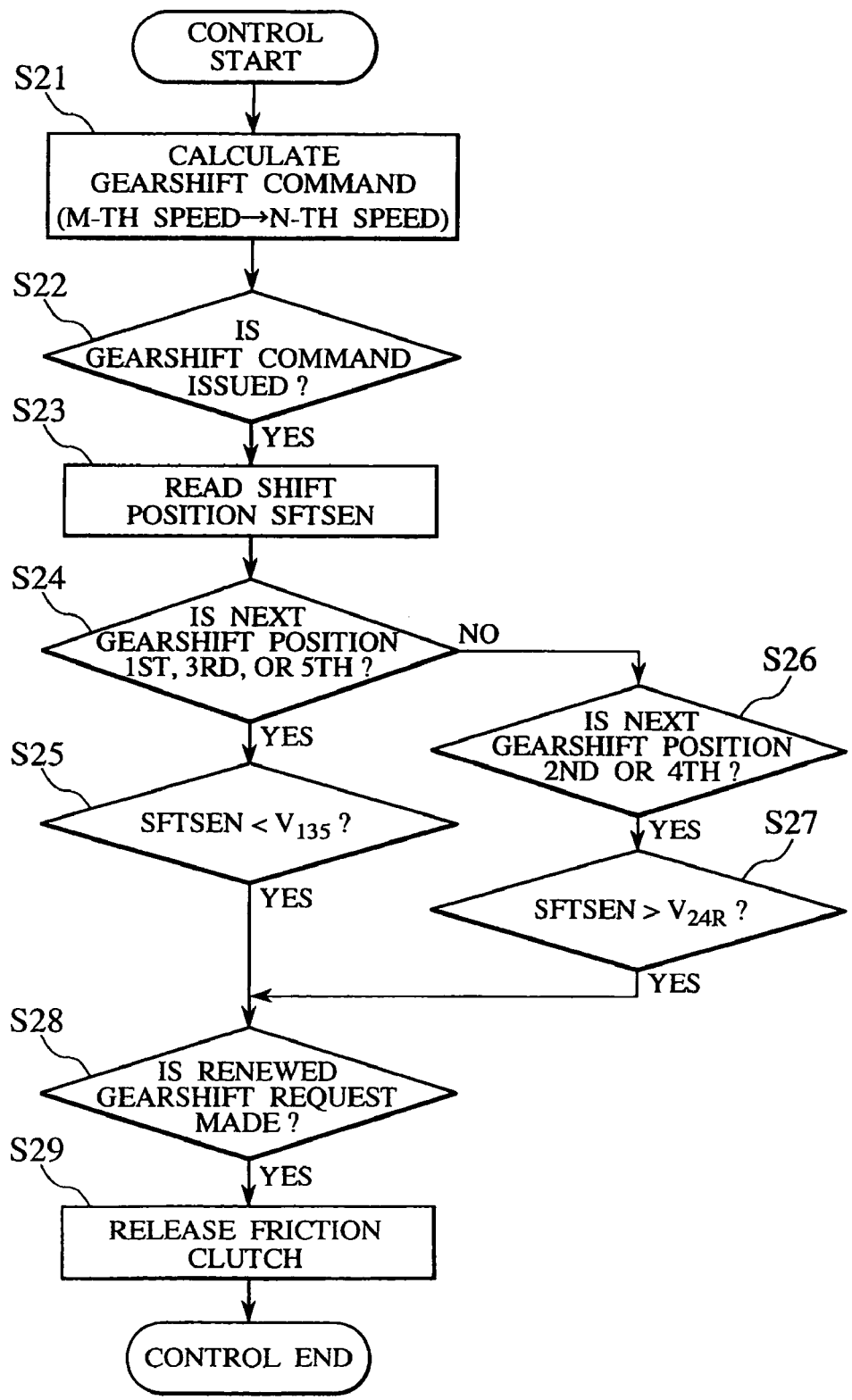
FIG. 11 is a flowchart showing control operations performed by a control system for a gear type transmission according to a third embodiment of the present invention.

FIG. 11 is a flowchart showing the control method used by the control system for the gear type transmission according to the third preferred embodiment of the present invention. The flowchart shown in FIG. 11 corresponds to a program written in the microprocessor of the control unit 12. More specifically, step S21 is performed by the gearshift command calculation portion 16. Receiving inputs of signals from the accelerator opening sensor 13 and the vehicle speed sensor 14, the gearshift command calculation portion 16 calculates a gearshift command from the m-th speed to the n-th speed using the gearshift map shown in FIG. 3. In step S22, it is determined whether or not a gearshift command is issued. Until a gearshift command is issued, loop processing is performed. When a gearshift command is issued, the control operation proceeds to step S23. In step S23, the signal from the shift position sensor 27A is read so that a position in the shift direction is detected. The progress of the gearshift operation is thereby detected. In step S24 that follows, it is determined whether or not the next predetermined gearshift position (the n-th speed) is in the same shift direction of the 1st speed, the 3rd speed, or the 5th speed. If it is determined that the next predetermined gearshift position is in the same shift direction of the 1st speed, the 3rd speed, or the 5th speed, the control operation proceeds to step S25. If it is determined that the next predetermined gearshift position is not in the same shift direction of the 1st speed, the 3rd speed, or the 5th speed, the control operation proceeds to step S26. Similarly, in step S26, it is determined whether or not the next predetermined gearshift position (the n-th speed) is in the same shift direction of the 2nd speed or the 4th speed. If it is determined that the next predetermined gearshift position is in the same shift direction of the 2nd speed or the 4th speed, the control operation proceeds to step S27. In step S25 and step S27, it is determined whether or not a gearshift operation into the next gearshift position (the n-th speed) is completed. What is done in step S25 or step S27 is to compare a value corresponding to the current shift position with a predetermined threshold value. If the position sensor signal does not exceed the predetermined threshold value, it is determined that the final shift operation into the n-th speed is yet to be completed. To respond to the next gearshift request, the control operation proceeds to step S28. In step S28, it is determined whether or not the next gearshift request has been made, based on the driver's accelerator operation or the signal from the operation lever 15. If it is determined in step S28 that there is issued the renewed gearshift request, the control operation proceeds to step S29. To meet the renewed gearshift request, the friction clutch 1 is released and the renewed gearshift operation is executed.

As described in the foregoing, if a renewed gearshift request is made during the gearshift operation employing the transmitting torque variable means for suppressing torque interruption during the gearshift operation, the friction clutch is temporarily released, thereby quickly selecting the gear train for the next gearshift position. This eliminates delay in gearshift operation. That is, when a renewed gearshift request command is issued, the driving torque in the output shaft temporarily drops to zero. Since the response lag in terms of gearshift response is improved, however, drivability can be enhanced.

FIG. 12 is a timing chart showing the control method used by the control system of the gear type transmission according to the third preferred embodiment of the present invention. The timing chart shown in FIG. 12 represents a condition, in which a renewed gearshift request to the 2nd speed is made by the driver's operating the accelerator pedal during an auto upshift operation from the 2nd speed to the 3rd speed.

At time t0, the gearshift command (from the 2nd speed to the 3rd speed) is determined according to the gearshift map. An ongoing gearshift flag as a control flag is then set. The subsequent operations up to time t2 are the same as those described with reference to FIG. 10.

When the renewed gearshift request to the 2nd speed is made by the driver's operating the accelerator pedal at time t3 as shown in FIG. 3, the gearshift operation corresponding to the renewed gearshift request is executed, since the renewed gearshift disabling flag is not set. In the first place, the engine torque is reduced and the throttle opening (not shown) is decreased. In the meantime, the transmitting torque command for the friction clutch 1 is decreased to correspond to the reduced amount of the engine torque. If the assist torque is zeroed, at this time, nothing restricts the input shaft. This results in the rotating speed of the input shaft making a sharp increase. The assist torque is therefore decreased only by the reduced amount of the engine torque. Torque is thereby generated corresponding to the change in the rotating speed equivalent to what is originally produced during the gearshift from the 2nd speed to the 3rd speed. When it is detected at time t4 that the engine torque has reduced to a point near zero, the friction clutch is completely released. At the same time, the assist torque is decreased in a ramp shape. The gearshift operation thereafter progresses through the same operations performed by the control method according to the first preferred embodiment of the present invention described with reference to FIG. 6. Then at time t7, a series of the renewed gearshift operations to meet the renewed gearshift request to the 2nd speed is completed.

As described in the foregoing, the gearshift response lag involved in disabling a renewed gearshift can be eliminated by temporarily releasing the friction clutch when the renewed gearshift request is made.

An object of the embodiments described above is to provide a gearshift control system and a gearshift control method for a gear type automatic transmission that executes, if a new gearshift request is made during a current gearshift operation in the gear type transmission, the renewed gearshift operation without allowing large gearshift shock or gearshift response lag to occur.

To achieve the foregoing object, a control system for a gear type transmission is provided which produces an output of a power drive through an output shaft by changing a speed of a driving force from a prime mover applied to an input shaft through a friction clutch by selecting any of a plurality of gear trains that are in constant mesh with each other. The control system is characterized in that, during a gearshift operation from a first predetermined gearshift position to a second predetermined gearshift position, if a renewed gearshift request to a third predetermined gearshift position is made, a renewed gearshift disabling period disabling the renewed gearshift request to the third predetermined gearshift position is provided.

With the arrangement as described above, it is possible to suppress large gearshift shock occurring due to the renewed gearshift operation.

In addition, a control system for a gear type transmission is provided which produces an output of a power drive through an output shaft by changing a speed of a driving force from a prime mover applied to an input shaft through a friction clutch by selecting any of a plurality of gear trains that are in constant mesh with each other. When engagement of the plurality of gear trains is switched from a first engagement to a second engagement, the control system for the gear type transmission forms a torque transmission path from the input shaft to the output shaft by controlling transmitting torque variable means provided at least for the gear trains. The control system for the gear type transmission is characterized in that, during a gearshift operation from a first predetermined gearshift position to a second predetermined gearshift position, if a renewed gearshift request to a third predetermined gearshift position is made, a renewed gearshift disabling period disabling the renewed gearshift request to the third predetermined gearshift position is provided.

With the arrangement as described above, it is possible to suppress a large gearshift shock occurring due to the renewed gearshift operation.

Preferably, the renewed gearshift disabling period is set after the transmitting torque of the gear train forming the first predetermined gearshift position has become zero.

With the arrangement as described above, an optimum renewed gearshift disabling period can be set, which improves a gearshift response lag involved in disabling a renewed gearshift.

A control system for a gear type transmission is provided which produces an output of a prime mover through an output shaft by changing a speed of a driving force from a prime mover applied to an input shaft through a friction clutch by selecting any of a plurality of gear trains that are in constant mesh with each other. When engagement of the plurality of gear trains is switched from a first engagement to a second engagement, the control system for the gear type transmission forms a torque transmission path from the input shaft to the output shaft by controlling transmitting torque variable means provided at least for the gear trains. The control system for the gear type transmission is characterized in that, if a new gearshift request is made during the gearshift operation, the friction clutch is released so as to temporarily shut off the driving force from the prime mover to the gear type transmission.

With the arrangement as described above, a gearshift response lag involved in disabling a renewed gearshift occurring when the renewed gearshift request is made can be improved.

A control system for a gear type transmission is provided which produces an output of a power drive through an output shaft by changing a speed of a driving force from a prime mover applied to an input shaft through a friction clutch by selecting any of a plurality of gear trains that are in constant mesh with each other. When engagement of the plurality of gear trains is switched from a first engagement to a second engagement, the control system for the gear type transmission forms a torque transmission path from the input shaft to the output shaft by controlling transmitting torque variable means provided at least for the gear trains. The control system for the gear type transmission is characterized in that, if the driving force from the prime mover is changed in an increasing direction through an accelerator operation during the gearshift operation, the driving force in the output shaft is temporarily decreased to a level equal to zero or below by releasing the friction clutch.

With the arrangement as described above, a gearshift response lag involved in disabling a renewed gearshift occurring when the renewed gearshift request is made can be improved.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A motor vehicle control unit controlling a gear type automatic transmission and an engagement selection mechanism of the transmission for selecting engagement of a gear train of the gear type automatic transmission,
   wherein the control unit is so configured and adapted to be associated with the automatic transmission so that, if a signal from an accelerator opening sensor and a signal from a vehicle speed sensor constitute a request for a new gearshift into a new target gearshift position different from a current target gearshift position while a current gearshift operation is being carried out in the gear type automatic transmission no command signal for the new gearshift into the new target gearshift position different from the current target gearshift position is output to a transmission actuator but the current gearshift operation continues to be carried out,
   wherein a period during which no command signal for the new output is set according to progress in the current gearshift operation, and
   wherein the period begins after a transmitting torque in the gear train forming the current target gearshift position becomes zero.

2. The motor vehicle control unit according to claim 1, wherein the period begins after the gear train engagement selection mechanism has moved in an axial direction over a predetermined distance toward a neutral direction from an axial position forming the current target gearshift position before the new gearshift operation.

3. A motor vehicle driving force transmission system comprising:
   a gear type transmission;
   an engagement selection mechanism for selecting engagement of a gear train of the gear type automatic transmission; and
   a control unit operatively associated with and controlling at least the engagement selection mechanism;
   wherein the control unit is so configured that, if a request is made for a new gearshift into a new target gearshift position different from a current target gearshift position while a current gearshift operation is being carried out in the gear type automatic transmission, the control unit disables any such new gearshift into the new target gearshift position different from the current target gearshift position and allows to continue the current gearshift operation into the current target gearshift position, wherein a sensor is provided for the engagement selection mechanism and a period during which the new gearshift is disabled is set according to an output signal from said sensor, and wherein the new gearshift disabling period begins after a transmitting torque in the gear train forming the current target gearshift position becomes zero.

4. The motor vehicle driving force transmission system according to claim 3, wherein the new gearshift disabling period begins after the gear train engagement selection mechanism has moved in an axial direction of the gear train over a predetermined distance toward a neutral direction from an axial position forming the current target gearshift position before the new gearshift operation, as detected by the sensor.

5. The motor vehicle driving force transmission system according to claim 3, wherein the gear type automatic transmission forms a gearshift position by selecting a gear train provided between an input shaft and an output shaft, applies a driving force from the prime mover to the input shaft through an associated friction clutch, and transmits torque to the output shaft using the selected gear train.

6. The motor vehicle driving force transmission system according to claim 3, wherein the engagement selection mechanism is actuated by a hydraulically operated actuator or an electrically operated actuator.

7. A motor vehicle driving force transmission system comprising, a sear type transmission;

an engagement selection mechanism for selecting engagement of a gear train of the gear type automatic transmission; and a control unit operatively associated with and controlling at least the engagement selection mechanism;

wherein the control unit is so configured that, if a request is made for a new gearshift into a new target gearshift position different from a current target gearshift position while a current gearshift operation is being carried out in the gear type automatic transmission, the control unit disables any such new gearshift into the new target gearshift position different from the current target gearshift position and allows to continue the current gearshift operation into the current target gearshift position, wherein the gear type automatic transmission forms a torque transmission path from the input shaft to the output shaft by controlling at least transmitting torque variable means provided for the plurality of gear trains, when engagement of the gear trains is switched from the engagement before the current gearshift to the engagement after the current gearshift, wherein the gear type automatic transmission produces an output of power from the prime mover through a friction clutch, the input shaft, and the output shaft, with changing speed ratio by selecting any of a plurality of gear trains that are in constant mesh with each other, wherein, if the driving force from the prime mover is changed in an increasing direction through an accelerator operation during the current gearshift operation, the driving force in the output shaft is temporarily decreased to a level equal to zero or below by releasing the friction clutch.

* * * * *